Sept. 13, 1955 C. H. JACOBSON 2,717,705
HYDRAULICALLY ACTUATED BALE LIFTER
Filed Feb. 11, 1953 3 Sheets-Sheet 3
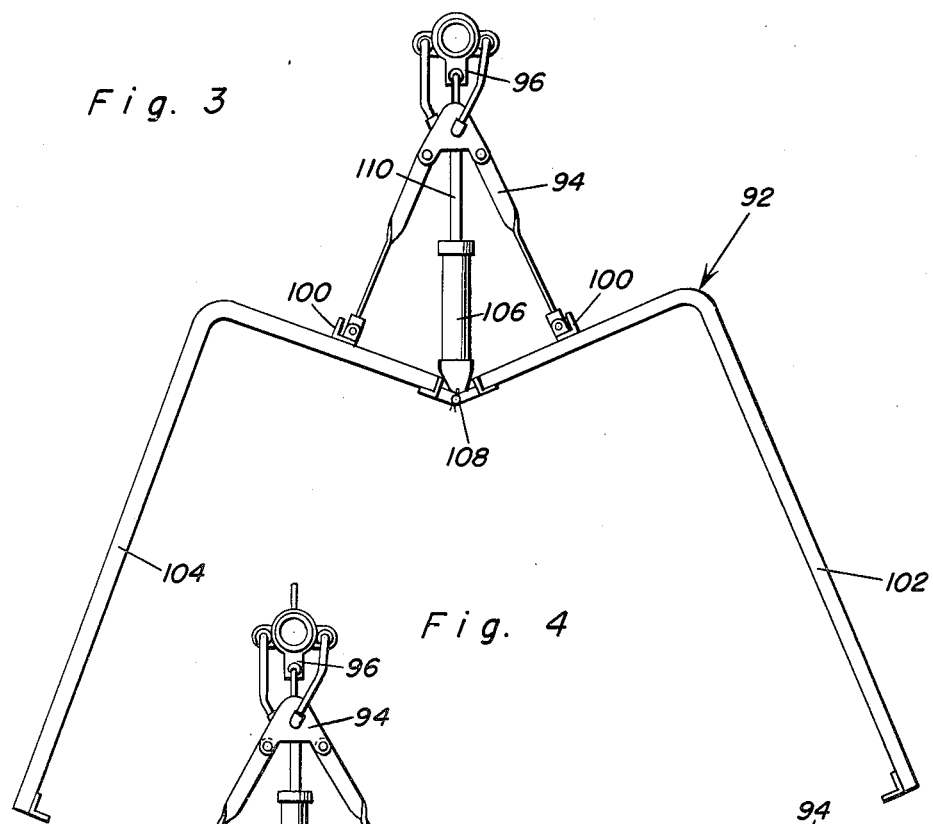
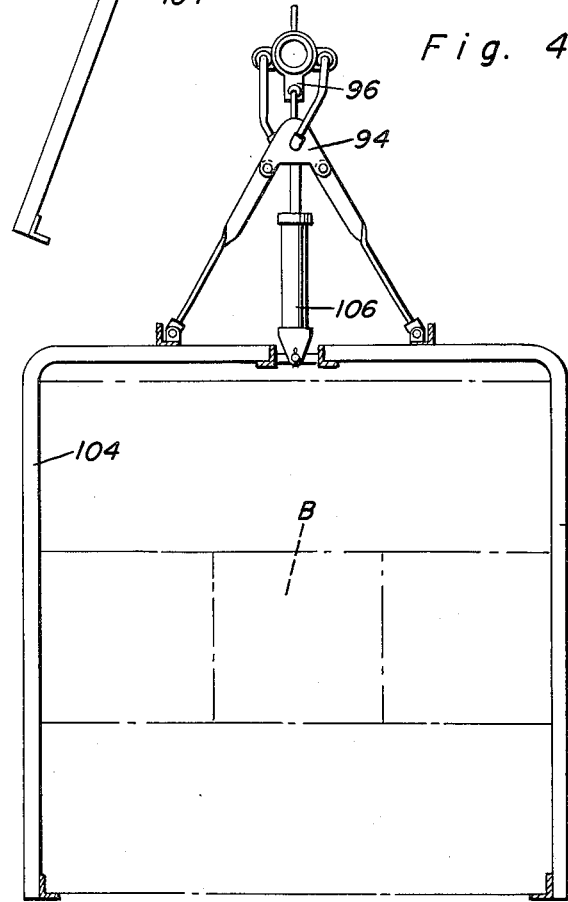
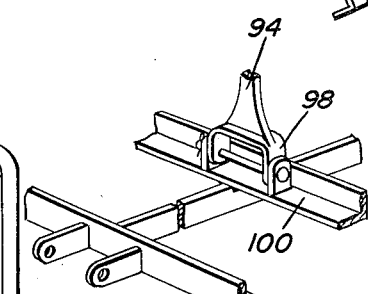
Carl H. Jacobson
INVENTOR.
BY *Clarence A. O'Brien*
*and Harvey B. Jacobson*
Attorneys United States Patent Office 2,717,705
Patented Sept. 13, 1955

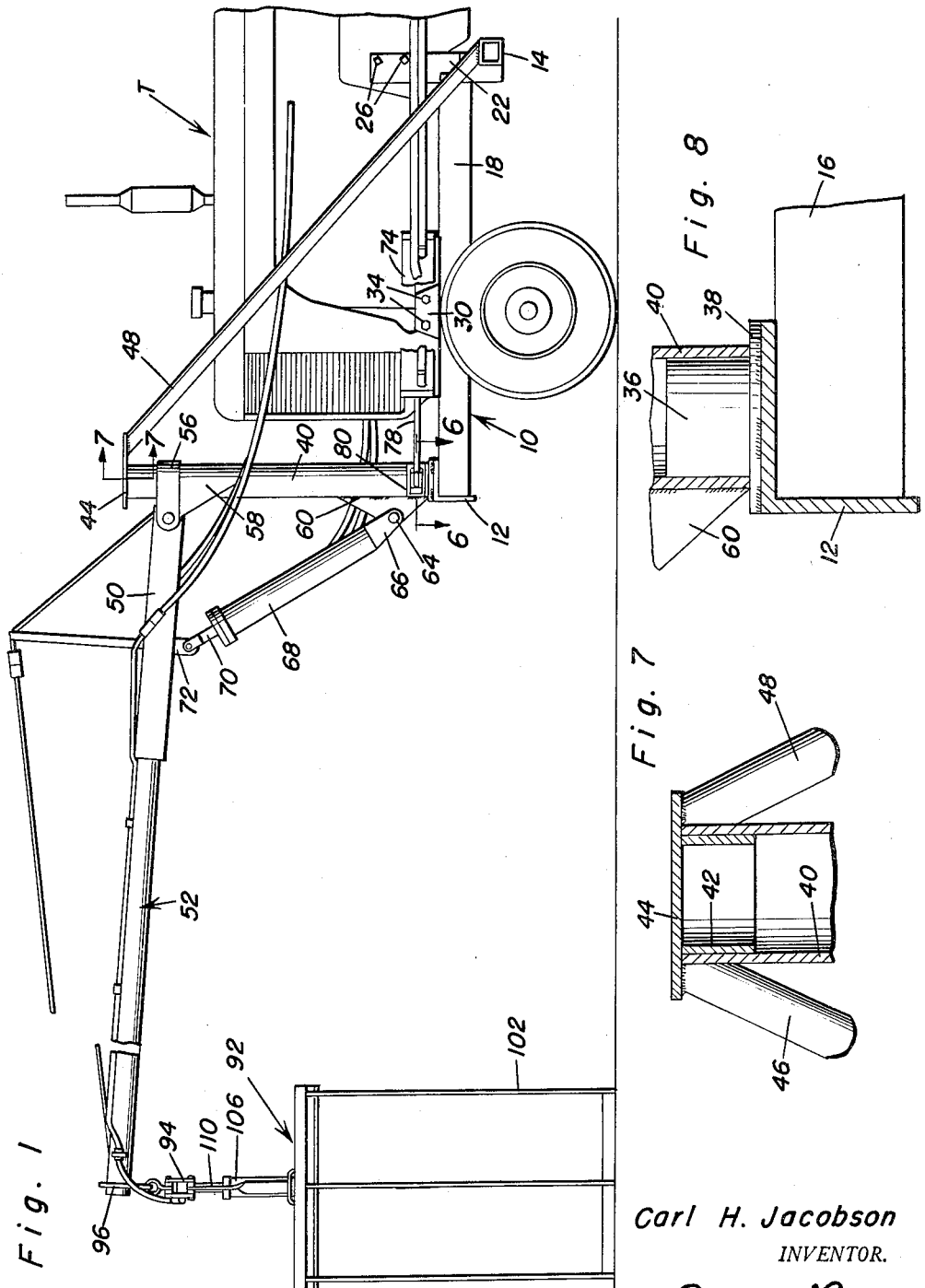

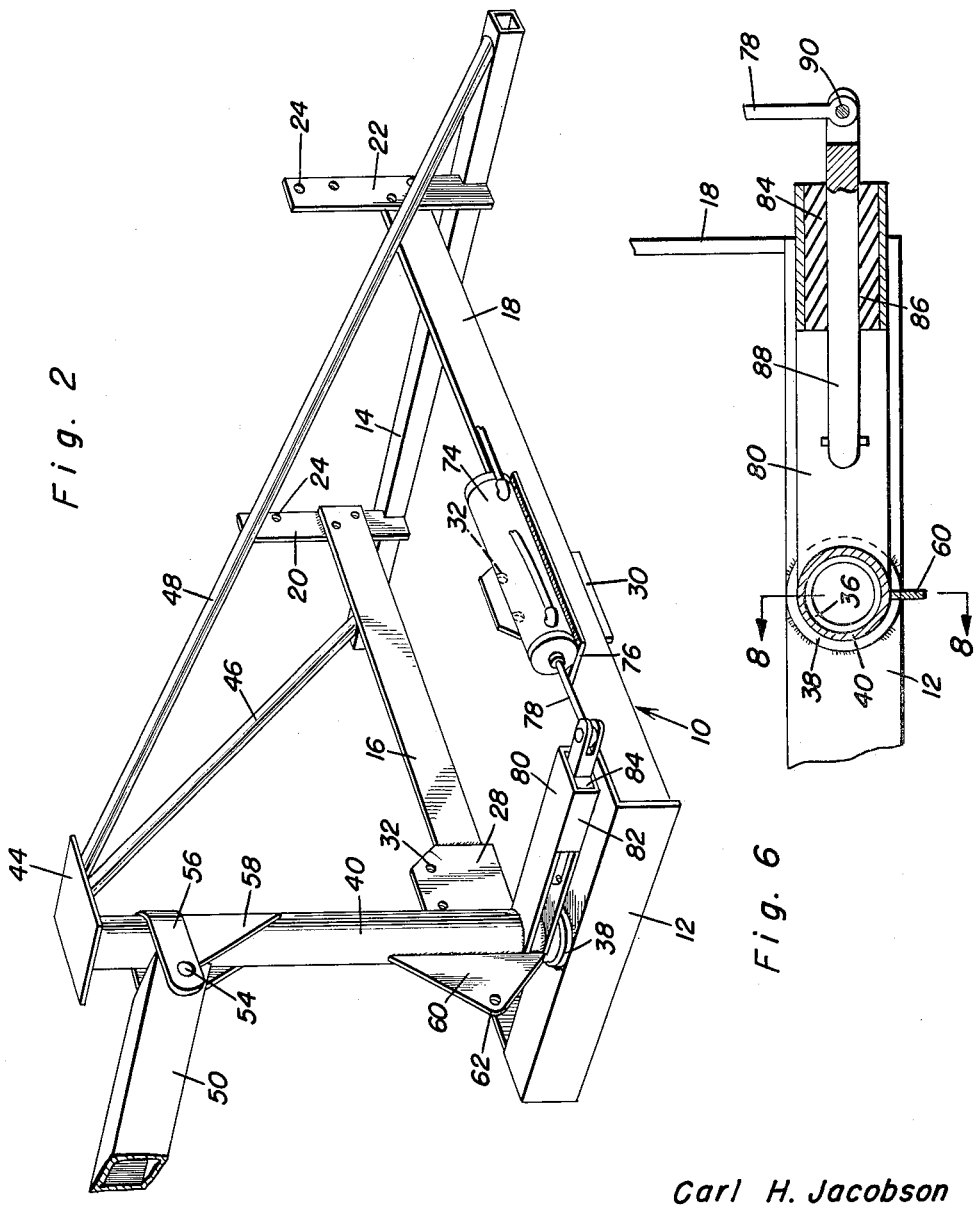

2,717,705
HYDRAULICALLY ACTUATED BALE LIFTER
Carl H. Jacobson, North Powder, Oreg.
Application February 11, 1953, Serial No. 336,238
3 Claims. (Cl. 214—147)

This invention relates to new and useful improvements in bale lifting and stacking apparatus and the primary object of the present invention is to provide a tractor-mounted hydraulically actuated bale lifter that is quickly and readily applied to or removed from the front end of a tractor in a convenient manner.

Another important object of the present invention is to provide a tractor-mounted hydraulically actuated bale lifter including a novel and improved frame construction that is removably secured to the sides of a tractor at the front end thereof and which carries a boom mounting means that may be rotated to position a boom at one side or the other of a tractor.

A further object of the present invention is to provide a tractor-mounted hydraulically actuated bale lifter including shock reducing and cushioning means for the boom mount whereby the boom may be swung horizontally in an efficient manner.

A still further aim of the present invention is to provide a hydraulically actuated bale lifting attachment for tractors that is extremely simple and practical in construction, strong and reliable in use, efficient and durable in operation, inexpensive to manufacture, assemble and maintain, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the present invention and showing the same mounted upon the front end of a tractor;

Figure 2 is a perspective view of the present invention and showing the boom raising and lowering means removed and the boom in section;

Figure 3 is a front elevational view of Figure 1 showing the bale lifter in an enlarged scale and with the gripping members spread apart;

Figure 4 is a view similar to Figure 3 but showing the lifting members moved toward each and engaged with bales (dotted lines);

Figure 5 is a fragmentary perspective view of one of the gripping members of the bale lifter;

Figure 6 is an enlarged detail horizontal sectional view taken substantially on the plane of section line 6—6 of Figure 1;

Figure 7 is an enlarged detail vertical sectional view taken substantially on the plane of section line 7—7 of Figure 1; and Figure 8 is an enlarged fragmentary vertical sectional view taken substantially on the plane of section line 8—8 of Figure 6.

Referring now to the drawings in detail, wherein for the purpose of illustration, there is disclosed a preferred embodiment of the present invention, the numeral 10 represents an open substantially rectangular frame including forward and rear end members 12 and 14, and a pair of side bars 16 and 18 extending between the forward and rear end members 12 and 14. The forward ends of the bars 16 and 18 are fixed by welding or the like to the forward end member 12 and the rear ends of the bars 16 and 18 are suitably fixed to the intermediate portion of vertical mounting arms 20 and 22 whose lower notched ends are fixed to the rear end members 14 adjacent the ends thereof.

The upper ends of the mounting arms 20 and 22 are provided with apertures 24 that will receive bolts 26, whereby the arms 20 and 22 may be secured against the sides of a tractor T behind the forward wheels of the tractor. Mounting plates 28 and 30 are fixed by welding or the like to the inner faces of bars 16 and 18 at the forward portions thereof and their upper ends extend above the bars 16 and 18 and are formed with apertures 32 that receive bolts 34, whereby the plates 28 and 30 will be secured to the sides of the tractor T in advance of the mounting arms 20 and 22.

In the above manner, the frame 10 is removably secured to the tractor with the rear member 14 extending under the tractor and with the forward member 12 disposed in front of the tractor. The side bars 16 and 18 extend rearwardly along the sides of the tractor at the forward end thereof and relatively close to the sides of the tractor.

A vertically disposed cylindrical stud 36 is provided with a lower flanged base 38 that is fixed by welding or the like to the horizontal flange of the angle iron end member 12 medially the ends of the member 12. The lower open end of a tubular post 40 is disposed over the stud 36 for rotation and rests upon the flanged base 38. A vertical bearing sleeve 42 is received in the upper open end of post 40 and fixedly supports a plate 44 at its upper end that rests upon the upper end of post 40.

The forward ends of a pair of rearwardly, outwardly and downwardly extending brace and supporting rods 46 and 48 are fixed by welding or the like to the plate 44. The rear ends of the rods 46 and 48 are fixed by welding or the like to the ends of the member 14 which project outwardly beyond the side bars 16 and 18.

The rear tubular section 50 of a boom 52 is pivoted, as at 54, to a U-shaped bracket 56 fixed about the upper end of post 40. The bracket 56 is reinforced and strengthened by a U-shaped gusset 58 also fixed to the post 40.

A vertical plate 60 welded to the lower end of post 40 is provided with a forward apertured apex portion 62 that is pivoted, as at 64, to an ear 66 at the lower closed end of a hydraulic cylinder 68. The upper end of the cylinder 68 slidably receives a piston rod 70 whose upper bifurcated end is pivoted to an ear 72 fixed to boom section 50.

Means is provided for rotating the post 40 so that the boom 52 may be swung horizontally from one side of the tractor to the other. This means comprises a hydraulic cylinder 74 that is suitably removably secured on a horizontal plate 76 fixed to bar 18. The forward end of cylinder 74 slidably receives a piston rod 78 that is operatively connected to the lower end of post 40 in a manner now to be described so that as the rod 78 is moved forwardly the post will be rotated in one direction, and as the rod 78 is moved rearwardly, the post 40 will be rotated in an opposite direction.

The inner end of a horizontal arm 80 is fixed by welding or the like to the lower end of post 40. The outer tubular end 82 of arm 80 has a rubber cushioning block 84 fixed therein which is provided with an axial bore 86 accommodating a rigid link 88. The inner end of link 88 is pivotally and transversely slidably secured to arm 80 and the outer bifurcated end of link 88 is pivoted, as at 90, to the forward eye end of piston rod 78. Block 84 will cushion the swinging movement imparted to link 88 by rod 78 as the arm 80 is swung for the purpose of rotating post 40.

The outer end of boom 52 supports a hydraulically actuated grapple or bale lifter 92. The bale lifter 92 includes an inverted, pivotally jointed, V-shaped hanger 94 whose apex is pivoted to a bracket 96 fixed to the outer end of boom 52. The lower bifurcated ends 98 of the limbs of hanger 94 are pivoted to angle iron cross bars 100 at the upper shorter legs of substantially L-shaped gripping frame members 102 and 104.

The closed lower end of a hydraulic cylinder 106 is pivoted to the pivot means 108 between the shorter legs of the members 102 and 104. The upper end of cylinder 106 slidably supports a tubular piston rod 110 that is suitably secured to the apex of hanger 94. As the rod 110 is extended from cylinder 106, the latter will be forced downwardly relative to the hanger 94 to open the members 102 and 104, and as the rod 110 is retracted in the cylinder 106, the members 102 and 104 will be forced toward each other.

The cylinders 68, 74 and 106 are operatively connected to the hydraulic system of the tractor T by flexible conduits provided with individual valve means so that liquid under pressure may be admitted into a selected cylinder at a selected end of the desired cylinder for the purpose of extending or retracting the piston rod of the selected cylinder. To avoid tangling of the conduits connecting the cylinder 106 to the hydraulic system of the tractor, these conduits are coupled to nipples on the tubular rod 110. The rod 110 is provided with two passages one of which terminates above the piston (not shown) fixed to rod 110 and the other of which terminates under this piston so that liquid under pressure may be admitted into the cylinder 106 either above or below the piston fixed to rod 110 for the purpose of extending or retracting the piston rod 110.

In practical use of the present invention, the frame 10 is mounted on the forward end of the tractor as aforementioned and the flexible conduits extending from the cylinders 68, 74 and 106 are operatively coupled to the hydraulic system of the tractor and to valves controlling the passage of liquid under pressure that is to be directed into the various cylinders. The tractor is moved forwardly to a desired location and the boom 52 is raised as the piston rod 70 is extended from cylinder 68. Then, longitudinal movement is imparted to piston rod 78 by fluid under pressure entering the cylinder 74 so that post 40 is rotated to position the boom 52 over the object, such as bales B which are disposed on the ground close to the tractor. Piston rod 110 is also extended from cylinder 106 so that the members 102 and 104 will be spread relative to each other as the boom 52 is lowered over the bales B.

After the boom 52 has been lowered by a lowering of the piston rod 70, the rod 110 is retracted with respect to cylinder 106 so that the members 102 and 104 will be forced toward each other to clampingly engage the bales B after which the boom 52 is again raised and the post 40 rotated to drop the bales B at a desired area.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A hydraulically actuated bale lifting attachment for tractors, said attachment comprising an open substantially rectangular frame, a post supported for rotation on the frame and extending upwardly from the frame, a boom pivoted to the post for vertical swinging movement and having a bale engaging grapple thereon, a hydraulic cylinder pivoted to the lower portion of the post and having a piston rod pivoted to the boom, a second hydraulic cylinder supported on the frame and having a piston rod pivotally attached to said post for rotating the post, and means carried by the frame engaging and supporting the upper end of said post for rotation, a rigid horizontal arm having an inner end fixed to the lower end of said post, a link pivotally and slidably attached to said horizontal arm and pivoted to the piston rod of said second cylinder, the outer end of said horizontal arm being tubular, and a rubber cushioning block fixed in the outer end of said horizontal arm and having an axial bore accommodating said link.

2. A hydraulically actuated bale lifting attachment for tractors, said attachment comprising an elongated substantially rectangular frame including forward and rear end members and a pair of side bars connecting and spacing said end members, vertical mounting arms having their lower ends fixed to said rear member and intermediate portions secured to the rear ends of said side bars, said arms having apertured ends adapted to receive bolts for securing the rear end of the frame to the sides of a tractor, mounting plates fixedly secured to the side bars adjacent the forward ends thereof and having bolt accommodating apertures whereby the forward portion of the frame may be bolted to the sides of a tractor forwardly of the mounting arms, a post supported on said forward end member for rotation, a rigid horizontal arm fixed to the lower end of said post and having an outer tubular end, a rubber block fixed in the outer end of said horizontal arm, said block having an axial bore, a link disposed in said bore and having an inner end pivotally and slidably secured to said horizontal arm, a hydraulic cylinder supported on one side bar of the frame and having a forwardly extending piston rod pivoted to the outer end of said link to swing the link against the block to rotate the post, a boom pivoted to the post for vertical swinging movement and having a bale engaging grapple thereon, and hydraulically actuated means connecting the post and boom for imparting vertical movement to the boom.

3. A hydraulically operated bale lifting attachment for tractors, said attachment comprising a frame, a post supported for rotation on the frame and extending upwardly of the frame, a boom pivoted on the post for vertical swinging movement and having a bale engaging grapple thereon, hydraulic means carried by said post and operatively connected to the boom to swing the same vertically, a rigid horizontal arm having one end fixed to the post and swingable to rotate the post, a resilient cushioning block fixed to said arm, a link pivoted to said arm and slidably extending through said block for cushioned pivotal movement to swing said arm, and a hydraulic cylinder supported on the frame and having a piston operatively connected to the link for pivoting said link.

References Cited in the file of this patent
UNITED STATES PATENTS

| | | |
|---|---|---|
| 2,468,201 | Hoover | Apr. 26, 1949 |
| 2,538,102 | Keeler | Jan. 16, 1951 |
| 2,599,991 | Hegre | June 10, 1952 |
| 2,622,749 | Stuhr | Dec. 23, 1952 |
| 2,648,449 | Hoover | Aug. 11, 1953 |